United States Patent
Zwayyed (10) Patent No.: US 9,739,533 B2
(45) Date of Patent: Aug. 22, 2017

(54) HARMONIC BALANCER FOR SPRAY DRYER ABSORBER ATOMIZER

(71) Applicant: ALSTOM Technology Ltd, Baden (CH)

(72) Inventor: Saleem Khader Zwayyed, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 247 days.

(21) Appl. No.: 14/818,608

(22) Filed: Aug. 5, 2015

(65) Prior Publication Data

US 2017/0038141 A1    Feb. 9, 2017

(51) Int. Cl.
| | |
|---|---|
| *B01F 3/04* | (2006.01) |
| *F26B 5/16* | (2006.01) |
| *B05B 3/10* | (2006.01) |
| *B01D 53/50* | (2006.01) |
| *F16F 15/36* | (2006.01) |
| *F26B 3/14* | (2006.01) |

(52) U.S. Cl.
CPC .............. *F26B 5/16* (2013.01); *B01D 53/505* (2013.01); *B01D 53/507* (2013.01); *B01F 3/04035* (2013.01); *B05B 3/10* (2013.01); *B05B 3/1057* (2013.01); *F16F 15/363* (2013.01); *F16F 15/366* (2013.01); *F26B 3/14* (2013.01)

(58) Field of Classification Search
CPC .... B01F 3/04; B01F 3/04007; B01F 3/04021; B01F 3/04028; B01F 3/04035
USPC .......................................... 261/78.2, 85, 89
See application file for complete search history.

(56) References Cited

U.S. PATENT DOCUMENTS

| | | |
|---|---|---|
| 2,587,083 A | 2/1952 | Andermatt |
| 4,121,770 A | 10/1978 | Straarup et al. |
| 4,141,783 A | 2/1979 | Pisecky et al. |
| 4,226,603 A | 10/1980 | Larsson et al. |
| 4,481,171 A | 11/1984 | Baran et al. |
| 4,502,872 A | 3/1985 | Ivester et al. |
| 4,519,990 A | 5/1985 | Bevilaqua et al. |
| 4,560,543 A | 12/1985 | Caspersen et al. |

(Continued)

FOREIGN PATENT DOCUMENTS

| | | | |
|---|---|---|---|
| GB | 2 131 328 A | | 6/1984 |
| JP | 2007222784 A | * | 9/2007 |
| WO | 03/023252 A1 | | 3/2003 |

OTHER PUBLICATIONS

International Search Report and Written Opinion issued in corresponding PCT Application No. PCT/IB2016/001217 dated Mar. 10, 2017.

*Primary Examiner* — Robert A Hopkins
(74) *Attorney, Agent, or Firm* — GE Global Patent Operation; Rita D. Vacca (57) ABSTRACT

A fluid type, gel/wax/paraffin type, or mechanical type harmonic balancer for built-in or retrofit use with an atomizer of a SDA flue gas desulfurization system for redu (56) References Cited

U.S. PATENT DOCUMENTS

| | | | |
|---|---|---|---|
| 4,571,311 A | 2/1986 | Ferguson, Jr. et al. | |
| 4,619,404 A | 10/1986 | Rasmussen | |
| 4,755,366 A | 7/1988 | Schwartzbach | |
| 4,874,400 A * | 10/1989 | Jury | B01D 53/504 95/218 |
| 2012/0174699 A1 | 7/2012 | Hoffmann et al. | |

* cited by examiner

HARMONIC BALANCER FOR SPRAY DRYER ABSORBER ATOMIZER

TECHNICAL FIELD

The present disclosure relates to a harmonic balancer for an atomizer of a spray dryer absorber (SDA) flue gas desulfurization system for reduced atomizer vibration, and a method of using the harmonic balancer on an atomizer of a SDA flue gas desulfurization system to reduce atomizer vibration, increase atomizer on-line service hours, decrease atomizer maintenance requirements and decrease atomizer associated costs.

More specifically, the present disclosure relates to a fluid type, gel/wax/paraffin type, or mechanical type harmonic balancer for built-in or retrofit use with an atomizer of a SDA flue gas desulfurization system for reduced atomizer vibration within or outside of the atomizer's harmonic range, and a method of using the built-in or retrofit harmonic balancer with an atomizer of a SDA flue gas desulfurization system to reduce atomizer vibration within or outside the atomizer's harmonic range, increase atomizer on-line service hours, decrease atomizer maintenance requirements, and decrease atomizer associated costs.

BACKGROUND

Combustion of fuel, particularly carbonaceous materials such as fossil fuels and waste, results in hot flue gas streams that contain impurities, such as mercury (Hg), sulfur oxides ($SO_X$), nitrogen oxides ($NO_X$), and particulates, such as fly ash, which must be removed or reduced to a more acceptable level prior to release of the flue gas to the environment. In response to regulations in place in many jurisdictions, numerous processes and equipment systems have been developed to remove or reduce impurity levels and/or particulates in flue gas.

Typical methods of reducing flue gas particulates, Hg, $NO_X$, and $SO_X$ impurities from steam generating boilers powered by fuel combustion is through the use of flue gas treatment equipment. Such equipment includes for example electrostatic precipitators (ESP), fabric filter bag houses, selective catalytic reduction (SCR) systems, wet flue gas desulfurization (WFGD) systems and/or dry flue gas desulfurization (DFGD) systems.

In some flue gas stream processing systems, removal of acidic components, such as $SO_X$, is facilitated through the use of a DFGD system, wherein a reagent slurry or solution is dispersed in the flue gas stream to react with the $SO_X$ present therein. Current DFGD systems utilize spray dryer absorber (SDA) vessels equipped with an atomizer system that receives a reagent slurry, typically in combination with a dilution liquid, and disperses the reagent or combination within the vessel for contact with the flue gas. Upon contact with the flue gas, the reagent slurry reacts with the impurities in the flue gas to produce dry powder products and a flue gas stream of reduced impurity content.

U.S. Pat. No. 4,226,603 discloses an atomizing device arranged centrally in an atomizing chamber. A processing gas is supplied around the atomizing device through a conical guide duct communicating with a horizontal spiral duct through an annular mouth. Processing gas distribution is adjusted by deflection of the gas stream from the spiral duct into the conical guide duct by means of two separate sets of stationary guide vanes arranged relatively close to and overlaying each other in the mouth. A damper is arranged along the mouth to control the ratio of the portions of the gas stream conducted into each of the two vane sets.

U.S. Pat. No. 4,481,171 discloses a spray reactor for flue gas desulfurization equipped with an atomizing disc to spray an alkaline reagent into a flue gas. Concentric inner and outer annular passages around the atomizing disc convey the flue gas. The outer passage flow is controlled by a series of dampers adapted to maintain a relatively constant flow velocity in the inner passage in response to turndown of the reactor load.

U.S. Pat. No. 4,519,990 discloses an atomizer located in an upper portion of a chamber for introducing a finely dispersed spray of aqueous medium, and a gas injection means for receiving a major portion of a hot gas stream for introduction circumferentially about the atomizer. An essential feature of the apparatus is that a minor portion of the hot gas stream is introduced into the chamber in a direction counter to the direction of swirl of the major portion of the hot gas stream passing downwardly through the chamber from about the atomizer.

U.S. Pat. No. 4,560,543 discloses an absorption chamber in which a stream of waste gas is injected downwards from an upper part thereof with an aqueous liquid containing an absorbent atomized into the gas stream. The water content of the aqueous liquid is adjusted depending on the drying capacity of the downward gas stream so the drying of the atomized liquid produces a particulate material having a moisture content of at least 3 percent by weight, to at least 10 percent by weight. A second gas stream is introduced upwards from a bottom part of the absorption chamber at a rate sufficient for fluidizing the moist particulate material within the absorption chamber.

U.S. Pat. No. 4,571,311 discloses a process gas treatment chamber with a pair of concentric, inner and outer annular gas inlet ducts surrounding a liquid spray apparatus. Partition means divide a spiral supply duct into independent inner and outer sub-ducts which define separate inner and outer flow passages connected respectively to the inner and outer annular gas inlet ducts. Damper means are provided in the inlet to the outer sub-duct to selectively control the flow of process gas there through as a means of maintaining the velocity of the flow of process gas through the inner flow passage at a minimum acceptable velocity.

U.S. Pat. No. 4,619,404 discloses a gas distribution arrangement with a helical inlet duct through an annular orifical slit for processing gas introduction into a space between two coaxial guide walls. Guide vanes are provided in the orifical slit to impart a change of direction to the flow of processing gas. Each guide vane is a spatial body with differently extending, vertical limitation surfaces which between adjacent vanes delimit ducts whose sectional area as measured transversely of the flow direction of the processing gas through the individual duct is substantially of the same size over the extent of the duct. The vertical height of the guide vanes may decrease along their radial extent inwards in the orifical slit, and their vertical limitation surfaces may form an acute angle at the radially innermost ends of the guide vanes.

A problem not addressed by the above-identified prior art, is the problem of undesirable harmonic or non-harmonic atomizer vibration. As known, a rotating component of a machine experiences harmonic oscillation at a particular speed of rotation due to speed and mass. Rotating a machine component at a speed in the component's harmonic range causes undesirable component oscillations or vibrations which thereby reduces the useful life of the machine component. Reducing the useful life of the machine component increases capital and operational costs associated therewith. Such is true of rotary atomizers used in SDA flue gas desulfurization systems. Depending on the speed at which the rotary atomizer is rotated, undesirable atomizer oscillations or vibrations result, thereby reducing the useful life of the atomizer, and increasing capital and operational costs associated therewith. Accordingly, an atomizer operable with lessened or without undesirable harmonic vibrations is needed.

SUMMARY OF THE DISCLOSURE

Harmonic balancers for atomizers of spray dryer absorber (SDA) flue gas desulfurization systems are disclosed herein. The harmonic balancers disclosed herein are operable to reduce flexible shaft or rigid shaft rotary type atomizer harmonic and non-harmonic vibration. By reducing such rotary atomizer vibration, atomizer on-line service is increased from about 200 hours to about 2000 hours, or upwards of 12,000 hours. Thus, atomizer maintenance and replacement costs are significantly reduced. The subject harmonic balancers may be fluid type, gel/wax/paraffin type, mechanical type or a combination thereof for built-in or retrofit use with rotary type atomizers of SDA flue gas desulfurization systems for reduced atomizer vibration within or outside the atomizer's harmonic range. Further, methods of using the subject built-in or retrofit harmonic balancers for flexible shaft or rigid shaft rotary type atomizers of SDA flue gas desulfurization systems to reduce atomizer vibration within or outside the atomizer's harmonic range are provided herein. Methods of using the subject built-in or retrofit harmonic balancers for flexible shaft or rigid shaft rotary type atomizers of SDA flue gas desulfurization systems increase atomizer on-line service hours, decrease atomizer maintenance requirements, and decrease atomizer associated costs.

One embodiment of the subject harmonic balancer is fabricated within an atomizer disk component of an atomizer. In a top surface of the atomizer disk, an annular channel of uniform depth and width extends around and a distance from a center of the atomizer disk. Extending from the channel, are at least two fluidly connected ports. Each of the ports are at least partially threaded adjacent the top surface of the atomizer disk. A planar top plate with openings therethrough aligning with each of the ports, is sized for removable fixation on the top surface of the atomizer disk to cover and seal the channel formed or machined in the top surface. Depending on the intended use of the atomizer as described in more detail below, through at least one of the ports a fluid, gel/wax/paraffin, mechanical members such as ball bearings, or a combination thereof is used to partially fill the channel while air displaced thereby flows out of at least one of the other ports. Depending on the size of the individual mechanical members and the size of the port, it may be necessary to arrange the mechanical members within the channel before the channel is sealed. Such would be the case if the mechanical members are of a size too large to pass through the port. Once the channel is filled, a flat headed screw is threadedly fixed within each of the at least two threaded ports thereby sealing the ports and securely removably fixing the top plate onto the atomizer disk. The atomizer disk is then fixed onto a free end of a flexible or rigid shaft extending from and below a center orifice of an atomizer distributor.

Another embodiment of the subject harmonic balancer is fabricated as a separate component removably affixed to a bottom surface of the atomizer disk component of the atomizer. As such, in a top surface of a planar balancer disk, an annular channel of relatively uniform depth and width is machined or formed to extend around and a distance from a center of the balancer disk. At the center of the balancer disk is a circular opening a distance from the channel. Extending from the channel, are at least two fluidly connected, at least partially threaded ports. A planar top plate is sized for removable fixation on the top surface of the balancer disk to cover and seal the channel formed or machined in the top surface of the balancer disk. Depending on the intended use of the atomizer as described in more detail below, through at least one of the ports a fluid, gel/wax/paraffin, mechanical members such as ball bearings, or a combination thereof is used to partially fill the channel while air displaced thereby flows out of at least one of the other ports. Once the channel is filled, a flat headed screw is threadedly fixed within each of the at least two threaded ports thereby sealing the ports and securely removably fixing the top plate onto the balancer disk. A plurality of spaced apart openings extend through the balancer disk a distance from the channel and around the periphery of the balancer disk. These spaced apart openings align with spaced apart, at least partially threaded openings on a bottom surface of an atomizer disk portion of an atomizer. Using flat head screws arranged and threadedly engaged within the aligned openings of the balancer disk and the atomizer disk, the balancer disk is removably fixed onto the bottom surface of the atomizer disk with the center circular opening of the balancer disk vertically aligning with the flexible or rigid shaft extending through the atomizer disk from and below a center orifice of an atomizer distributor.

The subject harmonic balancers are operable to reduce flexible shaft or rigid shaft rotary type atomizer vibration within or outside the atomizer's harmonic range. Due to the non-Newtonian properties of the one or more fluids, gel/wax/paraffin, mechanical members such as ball bearings, or a combination thereof, partially filling the channel of the harmonic balancer, the vibrational energy of the atomizer is converted to heat energy within the one or more fluids, gel/wax/paraffin, mechanical members such as ball bearings, or a combination thereof. The heat energy of the one or more fluids, gel/wax/paraffin, mechanical members such as ball bearings, or a combination thereof dissipates through the metal atomizer disk or balancer disk. Further, in the case of the atomizer disk, the fluid and/or slurry material dispersed from the atomizer also serves to cool or transfer heat from the atomizer disk. Additionally, as described in more detail below, the one or more fluids, gel/wax/paraffin, mechanical members such as ball bearings, or a combination thereof used to only partially fill the channel, may be displaced within the channel so as to provide a counter weight to thereby balance an unbalanced atomizer. So balancing the atomizer also reduces atomizer vibrations otherwise caused thereby.

A method of using a harmonic balancer of the subject disclosure comprises providing a channel in a top surface of a disk with at least two ports fluidly connected thereto, providing a plate to cover and seal the channel and having openings aligned with the at least two ports, partially filling the channel with a material of non-Newtonian properties, sealing the ports, and removably attaching the disk onto a flexible or rigid shaft below an atomizer distributor or removably attaching the disk to a bottom surface of an atomizer disk.

In summary, a spray dryer absorber atomizer with a balancer is disclosed herein comprising a distributor housing operable to distribute an absorbent liquid or slurry within a spray dryer absorber vessel, and an atomizer disk removably attached to the distributor housing comprising a sealed annular channel, at least two sealable ports fluidly connected to the annular channel, and a substance, mechanical members, or a combination thereof of non-Newtonian characteristics partially filling the annular channel. As such, each of the at least two ports are sealable by screws threadedly engaged therewith or similar such plugging means. The substance partially filling the annular channel is selected from the group consisting of natural oil, synthetic oil, high viscosity silicone, gel, wax, paraffin and combinations thereof depending on the operating conditions of the atomizer within the spray dryer absorber vessel. The annular channel could as an alternative be partially filled with mechanical members such as ball bearings, or with mechanical members in a substance such as ball bearings in a high viscosity silicone. The substance, member, or combination partially filling the annular channel is selected for stability at a temperature of about 200° F. to about 900° F., depending on the operating conditions within the spray dryer absorber vessel. For example, the selected substance partially filling the annular channel may be a high viscosity silicone stable at a temperature of about 300° F. to about 400° F. based on the operating conditions within the spray dryer absorber vessel. The partially filled annular channel and at least two ports fluidly connected thereto may be machined or formed within the atomizer disk. As an alternative, the partially filled annular channel and at least two ports fluidly connected thereto may be machined or formed within a component removably attached to the atomizer disk.

In summary, also disclosed herein is a method of fabricating a spray dryer absorber atomizer with a balancer that comprises providing a distributor housing operable to distribute an absorbent liquid or slurry within a spray dryer absorber vessel, providing an atomizer disk removably attached to the distributor housing comprising a sealed annular channel and at least two sealable ports fluidly connected to the annular channel, partially filling via a port the annular channel with a substance, mechanical members, or a combination thereof of non-Newtonian characteristics, and sealing each of the at least two ports after partially filling the annular channel. The annular channel and at least two ports may be machined or formed within the atomizer disk. As an alternative, the annular channel and at least two ports may be machined or formed within a component removably attached to the atomizer disk. Also, a method of using a spray dryer absorber atomizer with a balancer is disclosed herein comprising sealing a machined or formed annular channel of the spray dryer absorber atomizer, filling partially the annular channel with a substance, mechanical members, or a combination thereof of non-Newtonian characteristics using at least one port of at least two ports fluidly connected to the annular channel, and operating the spray dryer absorber atomizer for rotation thereof to disperse an absorbent liquid or slurry within a spray dryer absorber vessel. As such, the annular channel and at least two ports may be machined or formed within the atomizer disk. As an alternative, the annular channel and at least two ports may be machined or formed within a component removably attached to the atomizer disk, and for example partially filled with a high viscosity silicone, or with a high viscosity silicone and ball bearings, via at least one of the at least two ports.

DESCRIPTION OF THE DRAWINGS

The subject disclosure is now described in more detail with reference to the appended drawings in which.

DETAILED DESCRIPTION

Figure 1:
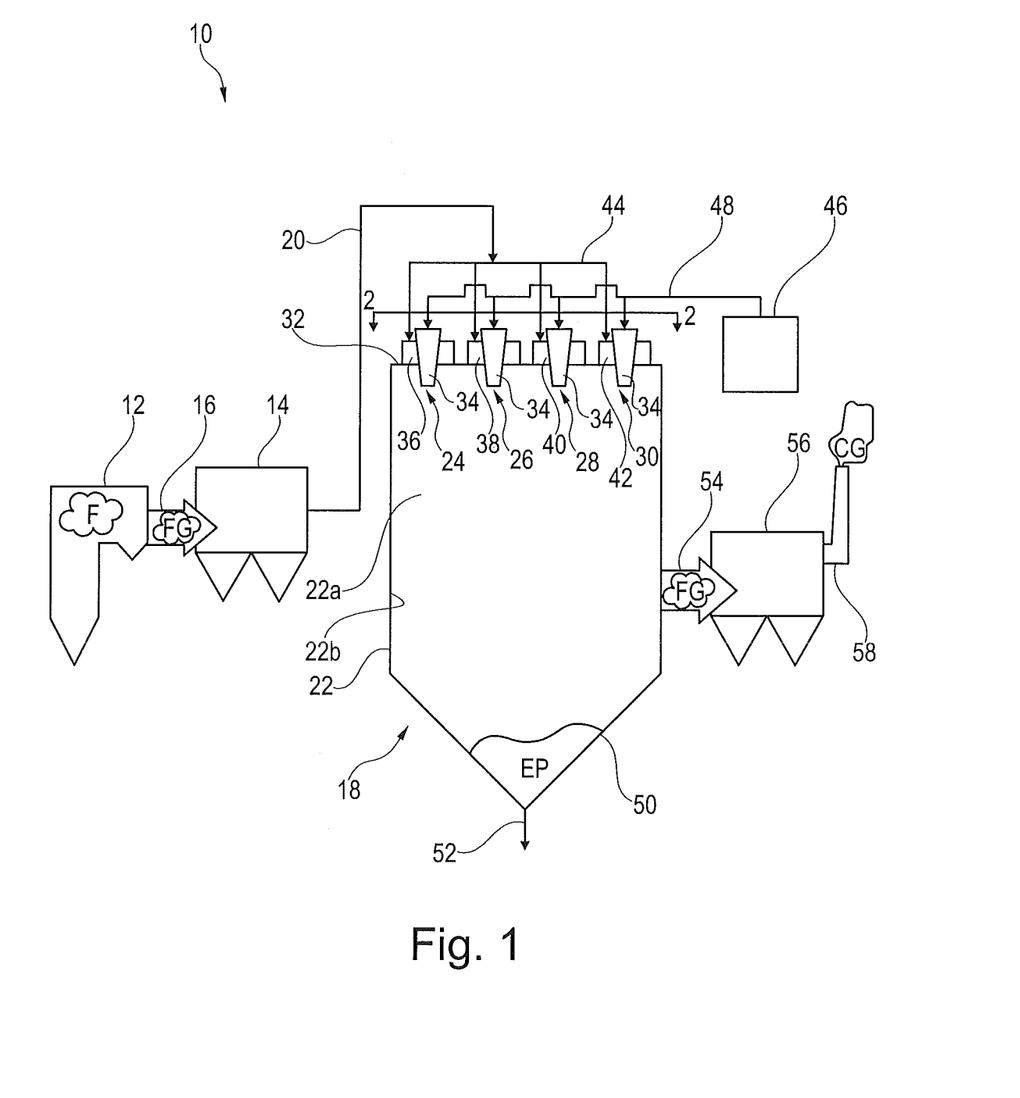
FIG. 1 is a schematic side view of a power plant.

FIG. 1 exemplifies a power plant 10. The power plant 10 comprises a boiler 12 in which a fuel F, such as coal or oil, is combusted. The combustion of the fuel F generates a hot process gas in the form of a flue gas FG. Sulphur species contained in the coal or oil produce upon combustion sulphur dioxide, which forms part of the flue gas FG. The flue gas FG flows from the boiler 12 to a fluidly connected electrostatic precipitator 14 via a duct 16. The electrostatic precipitator 14, an example of which is described in U.S. Pat. No. 4,502,872, the teachings of which are incorporated herein by reference, serves to remove dust particles from the flue gas FG.

Flue gas FG, from which most of the dust particles have been removed, then flows to a fluidly connected spray dryer absorber (SDA) system 18 via a fluidly connected duct 20. The SDA system 18 comprises a SDA vessel 22 that defines interior chamber 22a. One or more dispersers, 24, 26, 28, 30 of approximately 4 to approximately 5 meters in diameter are mounted at a roof 32 of the interior chamber 22a. Each disperser 24, 26, 28, 30 comprises an atomizer 34. The atomizers 34 are so-called rotary type atomizers, in which a disk spinning at a high velocity is operative for atomizing an absorption liquid or a reagent slurry. In this regard, reference may be had by way of exemplification and not limitation, to the rotary atomizer described in U.S. Pat. No. 4,755,366, the teachings of which are incorporated herein by reference.

Each disperser 24, 26, 28, 30 also comprises a flow directing device 36, 38, 40, 42. A dividing duct 44 supplies each of the fluidly connected dispersers 24, 26, 28, 30 with a portion of the flue gas FG from fluidly connected duct 20. Each of the flow directing devices 36, 38, 40, 42 is operative for imparting the respective portion of flue gas FG flowing therethrough with movement around the atomizers 34 of the respective dispersers 24, 26, 28, 30.

A supply source or tank 46 supplies each of the fluidly connected atomizers 34 with a flow of an absorption liquid or reagent slurry via fluidly connected distributing pipe 48. Such absorption liquid or reagent slurry comprises, for example, a limestone slurry with a dilution liquid of, for example, water.

The action of the respective dispersers 24, 26, 28, 30 result in a mixing of the flue gas FG with the absorption liquid or reagent slurry within interior chamber 22a. The result is that the absorption liquid or reagent slurry absorbs gaseous pollutants, such as sulphur dioxide, $SO_2$, from the flue gas FG to produce a flue gas with a decreased level of impurities therein. At the same time the absorption liquid or reagent slurry absorbs the gaseous pollutants, the absorption liquid or reagent slurry is dried by the hot flue gas FG, thereby producing a dry end product EP. The dry end product EP is collected at the bottom 50 of the interior chamber 22*a*. The dry end product EP is removed for disposal via a pipe 52 fluidly connected to interior chamber 22*a*. Flue gas FG, from which most of the gaseous pollutants have been removed, flows out of the SDA system 18 via a fluidly connected duct 54. As such, flue gas FG flows through duct 54, to a second filter 56, which may, for example, be an electrostatic precipitator. As an alternative option, the second filter 56 may be a bag house or any other suitable filtering device. The second filter 56 removes most of the remaining dust particles, and any dried residues of the absorption liquid or reagent slurry entrained in the flue gas FG. A cleaned flue gas CG of a reduced impurity level may then be released into the environment via a clean gas duct 58 fluidly connected to second filter 56.

Figure 2:
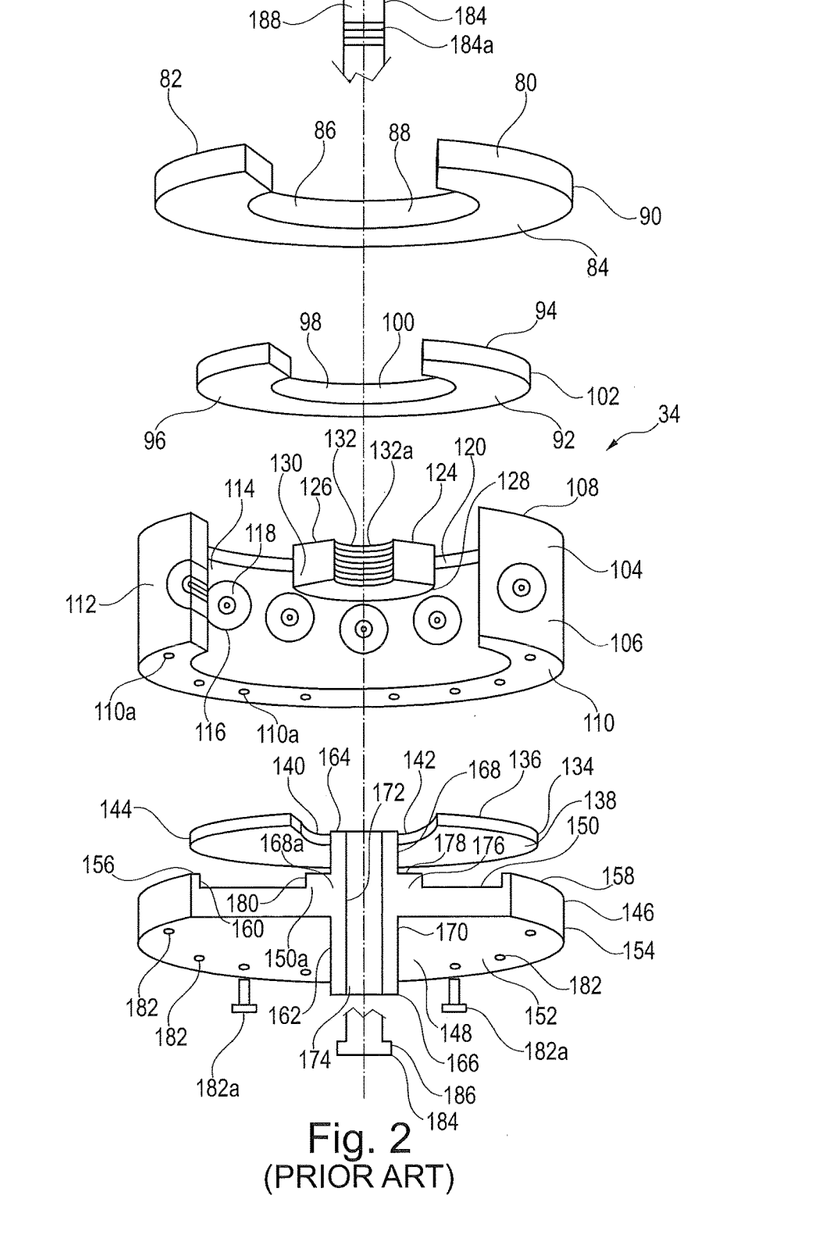
FIG. 2 is a schematic exploded partial side perspective view of a rotary atomizer.

FIG. 2 is an exploded partial view of rotary type atomizer 34 illustrating the individual components thereof. FIG. 2 is a "partial" view in that each of the individual components of atomizer 34 is illustrated with a front wedge cut away therefrom. As such, atomizer 34 comprises a solid planar top 80. Planar top 80 has a top surface 82, a bottom surface 84, a center opening 86 defined by an inner edge 88, and an outer edge 90. Atomizer 34 likewise comprises a solid planar disk 92. Planar disk 92 has a top surface 94, a bottom surface 96, a center opening 98 defined by an inner edge 100, and an outer edge 102. Atomizer 34 likewise comprises a distributor housing 104. Distributor housing 104 includes a tubular side wall 106 having a top surface 108, a bottom surface 110, an exterior surface 112 and an interior surface 114. Extending through tubular side wall 106 from exterior surface 112 through to interior surface 114 is a plurality of openings 116. Secured within each of the openings 116 is a nozzle or delivery plug 118. Adjacent top surface 108 on interior surface 114 is a protruding edge 120. Atomizer 34 likewise comprises center member 124. Center member 124 is a solid tubular shaped member having a top surface 126, a bottom surface 128, an exterior surface 130 and a threaded interior surface 132 defining opening 132*a* therethrough. Atomizer 34 likewise comprises a second solid planar disk 134. Second planar disk 134 has a top surface 136, a bottom surface 138, a center opening 140 defined by an inner edge 142, and an outer edge 144. Atomizer 34 likewise comprises a solid atomizer disk 146. Atomizer disk 146 includes a planar disk body 148 having a top surface 150 and a bottom surface 152. Along a periphery 154 of planar disk body 148 is an extended lip 156 extending from periphery 154 of bottom surface 152 beyond top surface 150 to form lip edge 158 and lip interior surface 160. Lip interior surface 160 is perpendicular to top surface 150. Centered in atomizer disk 146 is a tubular member 162. Tubular member 162 extends perpendicular to and beyond each top surface 150 and bottom surface 152. As such, tubular member 162 has a free top edge 164, an opposed free bottom edge 166, a top exterior surface 168, an opposed bottom exterior surface 170, an interior surface 172 extending between opposed free top edge 164 and free bottom edge 166, with interior surface 172 defining opening 174 therethrough. Extending around a portion 168*a* of top exterior surface 168 over a portion 150*a* of top surface 150 is an area 176 with a top surface 178 and perpendicular thereto, a side surface 180. Extending through disk body 148 from bottom surface 152 through to top surface 150 adjacent to periphery 154 is a plurality of at least partially threaded openings 182. Lastly, atomizer 34 comprises a flexible or rigid elongated shaft 184 with an end enlargement 186 opposite a free end 188.

The subject rotary atomizer 34 is assembled by slipping the free end 188 of shaft 184 through opening 174 of atomizer disk 146 so that free bottom edge 166 abuts end enlargement 186. Sized for arrangement on atomizer disk 146 is second planar disk 134. Second planar disk 134 is arranged with bottom surface 138 on top of and in contact with top surface 150 of atomizer disk 146 between lip interior surface 160 and side surface 180. Accordingly, inner edge 142 of second planar disk 134 abuts side surface 180 of atomizer disk 146, and outer edge 144 of second planar disk 134 abuts lip interior surface 160 of atomizer disk 146. When so arranged, top surface 136 of second planar disk 134 shares a common plane with lip edge 158 and top surface 178 of area 176. The free end 188 of shaft 184 is then slipped through opening 132*a* of center member 124 with threading 184*a* of shaft 184 engaging threaded interior surface 132 so that bottom surface 128 of center member 124 relatively tightly abuts free top edge 164 of tubular member 162. Distributor housing 104 is then placed over free end 188 of shaft 184 so that center member 124 is arranged within an interior area 114*a* defined by interior surface 114 of distributor housing 104. Atomizer disk 146 is removably fixed to distributor housing 104 by flat headed screws 182*a* engaged with the plurality of at least partially threaded openings 182 through atomizer disk 146 and aligned at least partially threaded openings 110*a* in bottom surface 110 of distributor housing 104. Planar disk 92 is then placed over free end 188 of shaft 184 so that inner edge 100 of planar disk 92 abuts exterior surface 130 of center member 124, and outer edge 102 of planar disk 92 abuts interior surface 114 supported by protruding edge 120. As such, top surface 94 of planar disk 92 shares a common plane with top surface 108 of distributor housing 104. Finally, planar top 80 is slipped over free end 188 of shaft 184 so that inner edge 88 of planar top 80 abuts exterior surface 130 of center member 124, so that top surface 82 of planar top 80 shares a common plane with top surface 126 of center member 124. Additionally, bottom surface 84 of planar top 80 abuts top surface 94 of planar disk 92 and top surface 108 of distributor housing 104. Once assembled, absorption liquid or slurry is delivered to distributor housing 104 which is rotated on shaft 184 to thereby disperse by centrifugal force the absorption liquid or slurry from interior area 114*a* of distributor housing 104 via nozzle or delivery plug 118.

Figure 3:
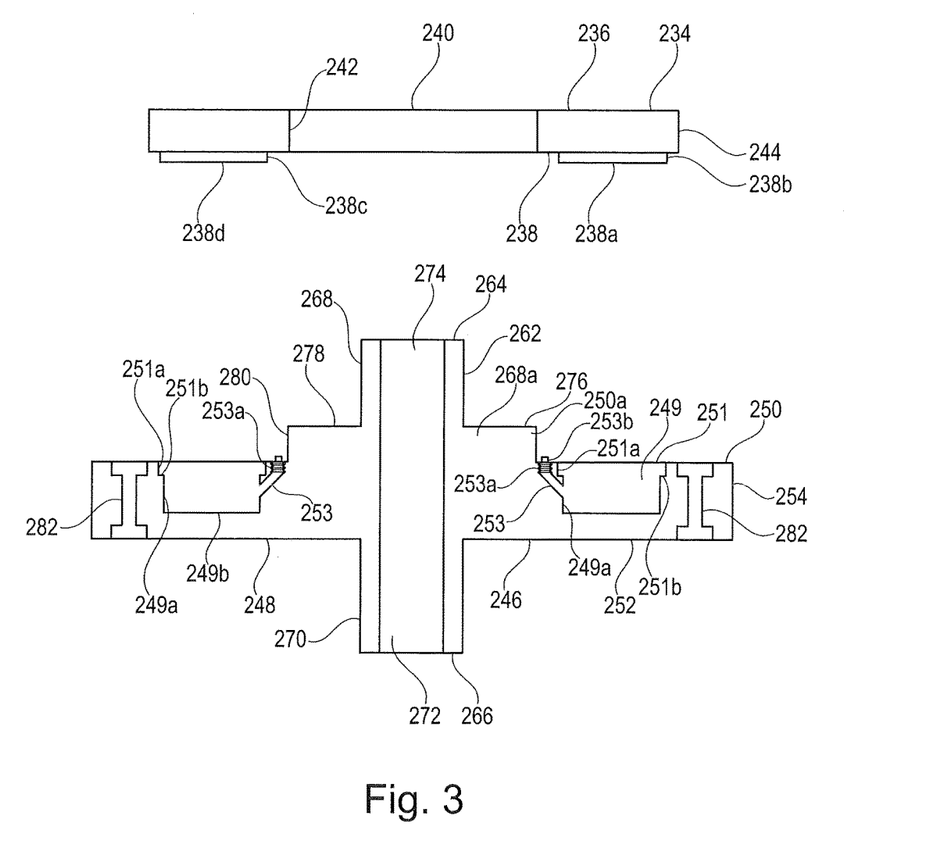
FIG. 3 is a schematic exploded side cross sectional view of one embodiment of a harmonic balancer in accordance with the subject disclosure.

A first embodiment of the subject balancer is illustrated in FIG. 3. FIG. 3 illustrates a side exploded view of a second solid planar disk 234 for an atomizer 34. Second planar disk 234 has a top surface 236, a bottom surface 238, a center opening 240 defined by an inner edge 242, and an outer edge 244. Extending a distance from bottom surface 238 is an extended circular area 238*a* having a side exterior surface 238*b*, a side interior surface 238*c* and a bottom surface 238*d*. According to the subject embodiment, atomizer 34 likewise comprises a solid atomizer disk 246. Atomizer disk 246 includes a planar disk body 248 having a top surface 250 and a bottom surface 252. Centered in atomizer disk 246 is a tubular member 262. Tubular member 262 extends perpendicular to and beyond each top surface 250 and bottom surface 252. As such, tubular member 262 has a free top edge 264, an opposed free bottom edge 266, a top exterior surface 268, an opposed bottom exterior surface 270, an interior surface 272 extending between opposed free top edge 264 and free bottom edge 266, with interior surface 272 defining opening 274 therethrough. Extending around a portion 268a of top exterior surface 268 over a portion 250a of top surface 250 is an area 276 with a top surface 278 and perpendicular thereto, a side surface 280. Extending through disk body 248 from bottom surface 252 through to top surface 250 adjacent to periphery 254 is a plurality of at least partially threaded openings 282. Machined into or formed in top surface 250 of disk body 248 is an annular channel 249 around and a distance from area 276. Annular channel 249 is defined by opposed interior side walls 249a and bottom surface 249b. Adjacent top surface 250 in annular channel 249 is an enlarged channel 251 of lesser depth having opposed interior side surfaces 251a and a bottom surface 251b extending beyond side walls 249a of annular channel 249. Adjacent to area 276 fluidly connected to annular channel 249 through an interior side wall 249a is at least two partially threaded 253a ports 253. Annular channel 249 is then partially filled with one or more substances and/or mechanical members of non-Newtonian characteristics SNC via at least one port 253 of the at least two ports 253 to allow air displaced by the one or more substances and/or mechanical members of non-Newtonian characteristics SNC to flow out of the annular channel 249 via at least one port 253 of the at least two ports 253. Depending on the size of the individual mechanical members and the size of the port 253, it may be necessary to arrange the mechanical members within the annular channel 249 before the annular channel 249 is sealed. Such would be the case if the mechanical members are of a size too large to pass through the port 253. After the annular channel 249 is partially filled with one or more substances and/or mechanical members of non-Newtonian characteristics SNC, the at least two ports 253 are sealed. To seal ports 253, flat headed threaded screws 253b are threadedly engaged within the threaded 253a ports 253.

When the second planar disk 234 is assembled with the atomizer disk 246, extended circular area 238a of the second planar disk 234 extends into enlarged channel 251 so that bottom surface 238d abuts bottom surface 251b, and side exterior surface 238b and side interior surface 238c abut opposed interior side surfaces 251a of enlarged channel 251 to thereby seal annular channel 249. Further, when second planar disk 234 and atomizer disk 246 are assembled, bottom surface 238 of second planar disk 234 abuts top surface 250 of atomizer disk 246. As such, top surface 236 of second planar disk 234 shares a common plane with top surface 278 of area 276.

Figure 4:
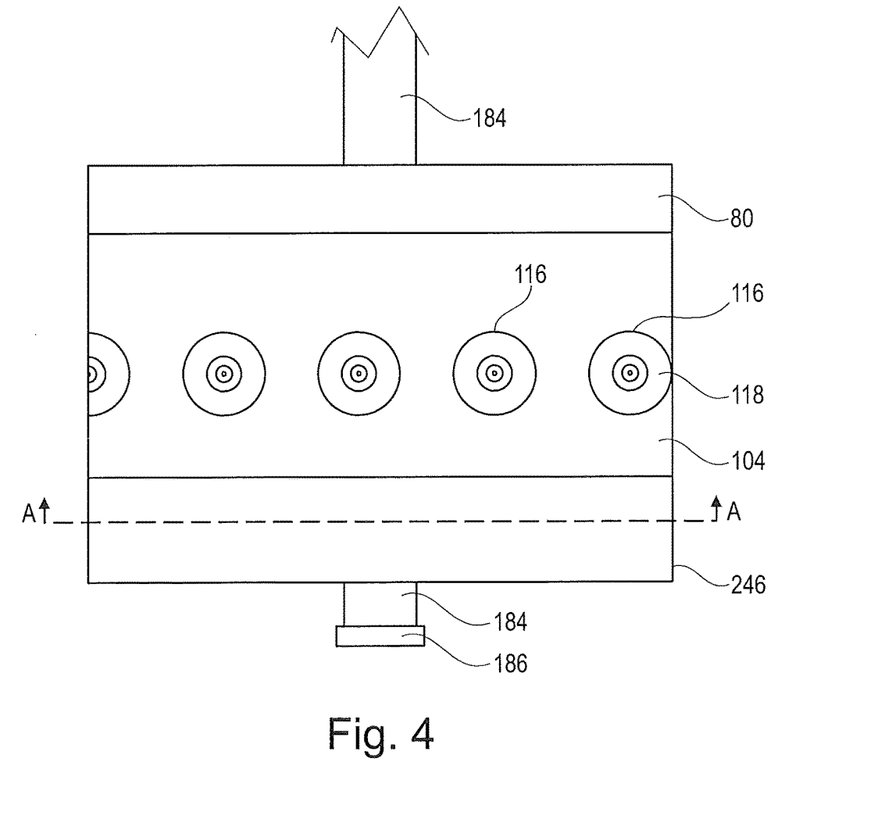
FIG. 4 is a schematic side view of the harmonic balancer of FIG. 3 removably affixed to an atomizer.

FIG. 4 is a schematic illustration of the second planar disk 234 (not shown in FIG. 4) and atomizer disk 246 of the subject disclosure replacing the prior art second planar disk 134 and atomizer disk 146 of the assembled spray dryer atomizer 34.

Figure 5:
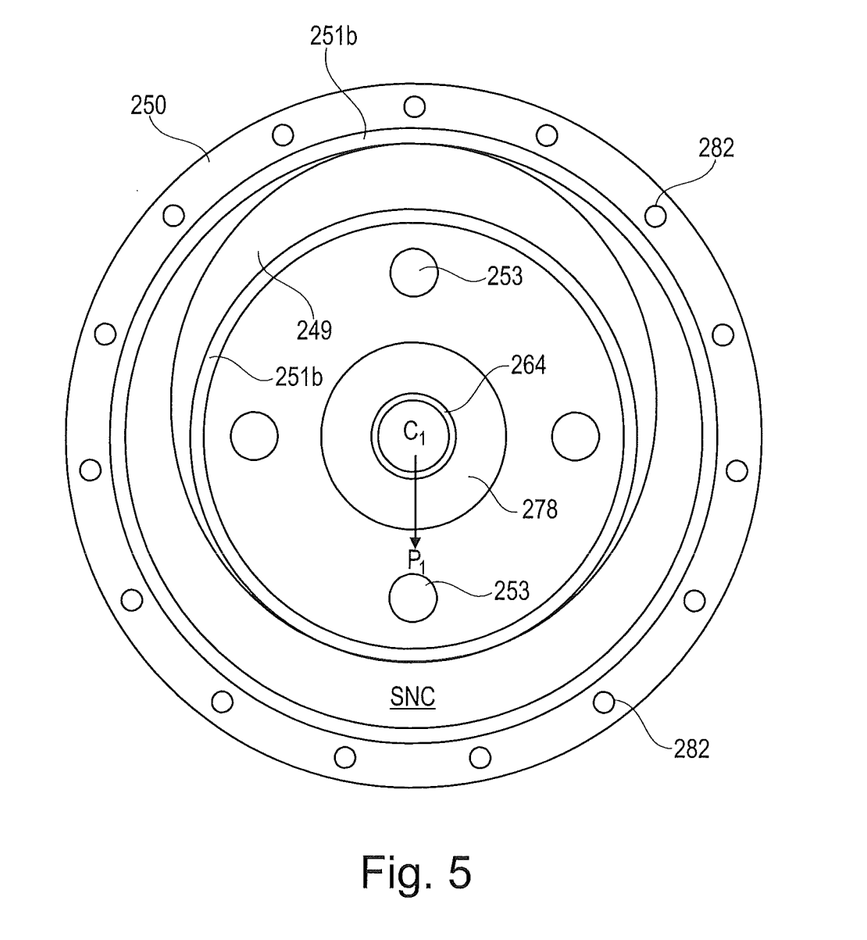
FIG. 5 is a schematic bottom cross section view of the harmonic balancer of FIG. 4 taken along line A-A removably affixed to an unbalanced atomizer.
Figure 6:
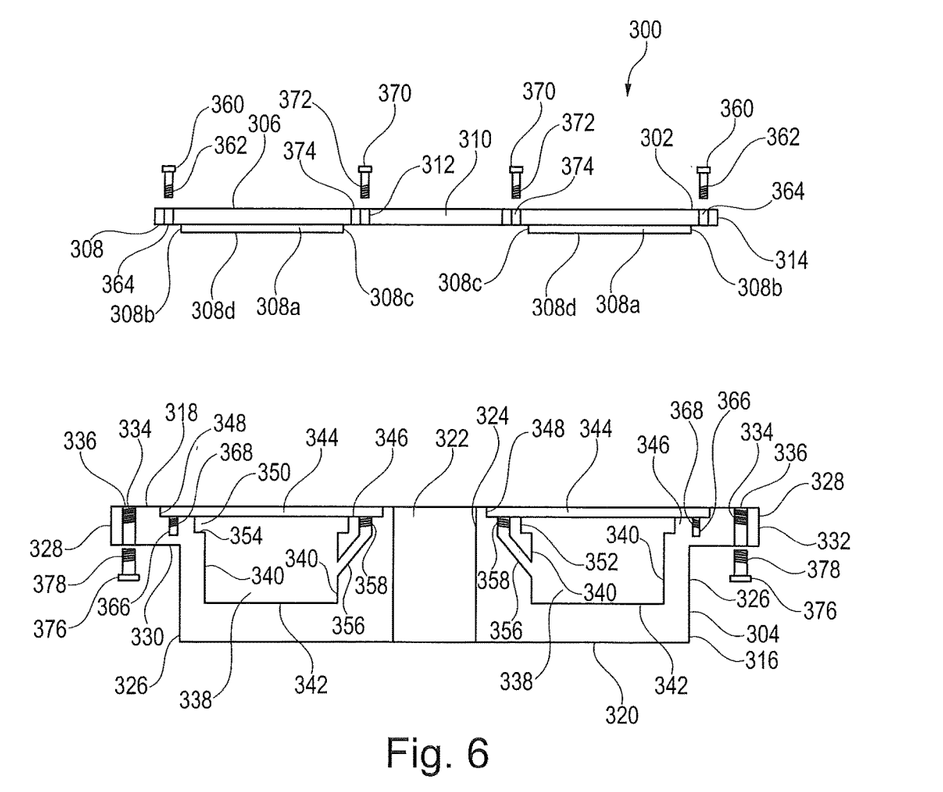
FIG. 6 is a schematic exploded side cross sectional view of another embodiment of a harmonic balancer in accordance with the subject disclosure.

Illustrated in FIG. 5 is a top view of a cross section of atomizer disk 246 taken along line AA of FIG. 4. Rather than the atomizer 34 being balanced around center C1 of the atomizer disk 246, atomizer 34 is balanced around point P1, i.e., out of balance. For this reason, the substance and/or mechanical members of non-Newtonian characteristics SNC partially filling channel 249 upon rotation collects in a portion of channel 249 while vacating an opposite portion of channel 249 to thereby balance the atomizer 34 around center C1 to reduce or eliminate any non-harmonic vibration resulting from the imbalance. In the case of a harmonic vibration in atomizer 34, the substance and/or mechanical members of non-Newtonian characteristics SNC partially filling channel 249 absorb the harmonic vibrational energy and converts the harmonic vibrational energy to heat energy. The heat energy over time gradually dissipates from the substance and/or mechanical members of non-Newtonian characteristics SNC partially filling channel 249 into surfaces forming channel 249 and its surrounding areas.

Illustrated in FIG. 6 is another embodiment of the subject balancer 300. FIG. 6 illustrates a side exploded view of a sealing member 302 for balancer base 304. Sealing member 302 has a top surface 306, a bottom surface 308, a center opening 310 defined by an inner edge 312, and an outer edge 314. Extending a distance from bottom surface 308 is an extended annular area 308*a* having a side exterior surface 308*b*, a side interior surface 308*c* and a bottom surface 308*d*. According to the subject embodiment, balancer 300 likewise comprises a balancer base 304. Balancer base 304 includes a planar disk body 316 having a top surface 318, a bottom surface 320 and a side surface 326. Centered through balancer base 304 is an opening 322 defined by interior surface 324. Extending from side surface 326 adjacent top surface 318 is an extended tab 328. Extended tab 328 includes a bottom surface 330, side surface 332, and a plurality of at least partially threaded 334 openings 336. Formed or machined into top surface 318 of balancer base 304 is an annular channel 338 with opposed side walls 340 and a bottom 342. Within side wall 340 adjacent top surface 318 is an indentation 344 including a bottom 346 and a side surface 348. Also within side wall 340 adjacent bottom 346 of indentation 344 is an indentation 350. Indentation 350 is defined by side wall 352 and bottom 354. Arranged between interior surface 324 of opening 322 and side wall 340 of annular channel 338 through bottom 346 of indentation 344 are at least two ports 356 with threading 358 fluidly connected to annular channel 338 via side wall 340. Sealing member 302 is sized for arrangement within indentation 344. As such, the outer edge 314, the bottom surface 308, and the inner edge 314 of sealing member 302 abut side surface 348, bottom 346 and side surface 348 of indentation 344, respectively. When so positioned, top surface 306 of sealing member 302 shares a common plane with top surface 318 of balancer base 304. Further, when so positioned, side exterior surface 308*b*, bottom surface 308*d* and side interior surface 308*c* of extended annular area 308*a* abut side wall 352, bottom 354 and side wall 352 of indentation 350, respectively, to thus seal annular channel 338. Sealing member 302 is removably attached to balancer base 304 through the use of flat headed screws 360 with threading 362 arranged within openings 364 through sealing member 302 and aligned openings 366 with threading 368 in bottom 346 of indentation 344. Annular channel 338 is then partially filled with one or more substances and/or mechanical members of non-Newtonian characteristics SNC via at least one port 356 of the at least two ports 356 to allow air displaced by the one or more substances and/or mechanical members of non-Newtonian characteristics SNC flows out of the annular channel 338 via at least one port 356 of the at least two ports 356. Depending on the size of the individual mechanical members and the size of the port 356, it may be necessary to arrange the mechanical members within the annular channel 338 before the annular channel 338 is sealed. Such would be the case if the mechanical members are of a size too large to pass through the port 356. After the annular channel 338 is partially filled with one or more substances and/or mechanical members of non-Newtonian characteristics SNC, the at least two ports 356 are sealed through the use of flat headed screws 370 with threading 372 arranged within openings 374 through sealing member 302 and aligned ports 356 with threading 358 in bottom 346 of indentation 344. Flat headed screws 376 with threading 378 arranged through openings 336 with threading 334 aligned with and engaged by threading 378 within multiple openings 182 of atomizer disk 146 (FIG. 2) removably attaches balancer 300 to atomizer disk 146. As such, balancer 300 may be used to retrofit atomizer 34.

Figure 7:
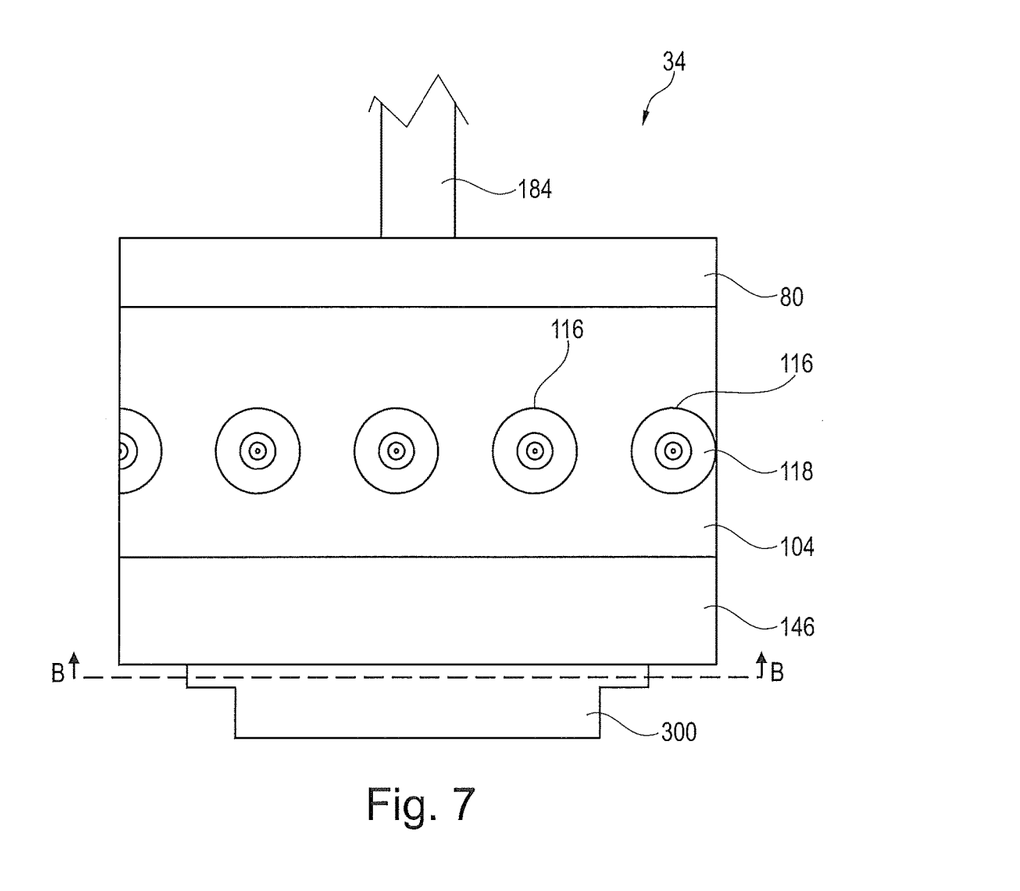
FIG. 7 is a schematic side view of the harmonic balancer of FIG. 6 removably affixed to an atomizer.

FIG. 7 is a schematic illustration of the sealing member 302 (not shown in FIG. 7) and balancer base 304 of balancer 300 removably attached to the atomizer disk 146 of the assembled spray dryer atomizer 34.

Figure 8:
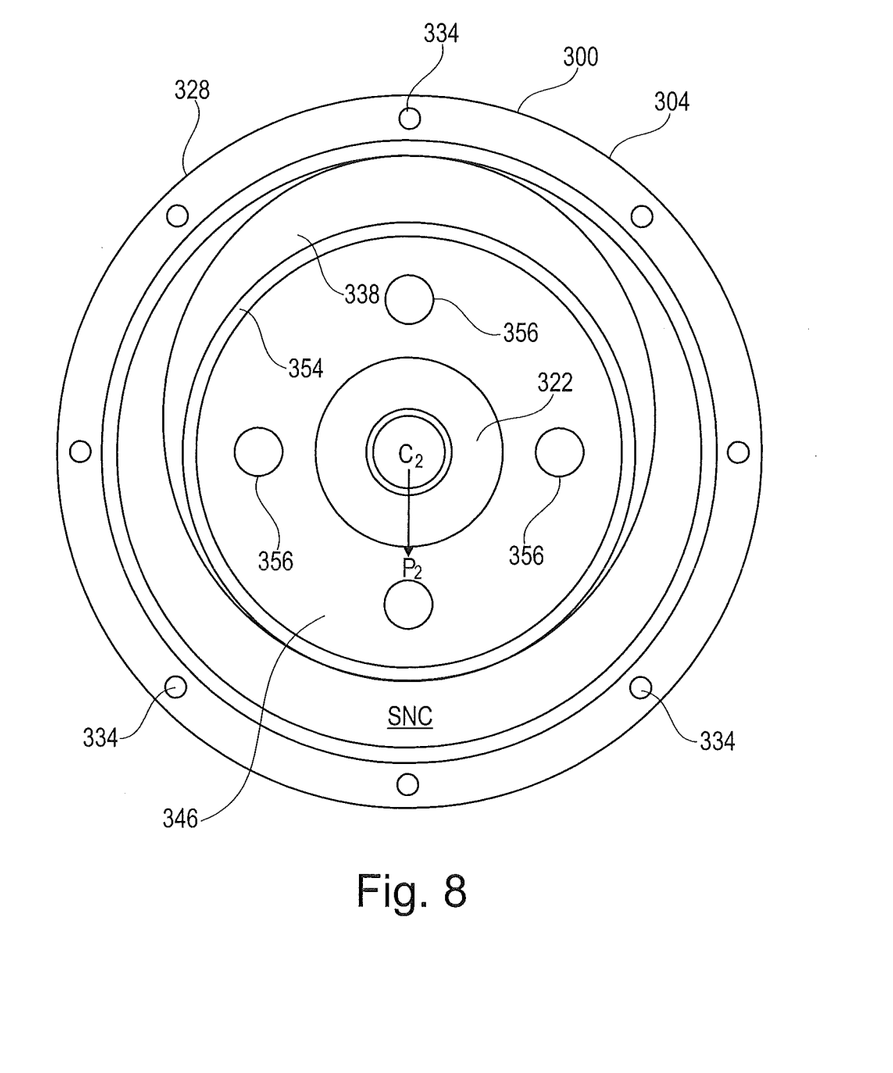
FIG. 8 is a schematic bottom cross section view of the harmonic balancer of FIG. 7 taken along line B-B removably affixed to an unbalanced atomizer.

Illustrated in FIG. 8 is a top view of a cross section of balancer base 304 taken along line BB of FIG. 7. Rather than the atomizer 34 being balanced around center C2 of balancer base 304, atomizer 34 is balanced around point P2, i.e., out of balance. For this reason, the substances and/or mechanical members of non-Newtonian characteristics SNC partially filling channel 338 upon rotation collects in a portion of channel 338 while vacating an opposite portion of channel 338 to thereby balance the atomizer 34 around center C2 to reduce or eliminate any non-harmonic vibration resulting from the imbalance. In the case of a harmonic vibration in atomizer 34, the substances and/or mechanical members of non-Newtonian characteristics SNC partially filling channel 338 absorb the harmonic vibrational energy and converts the harmonic vibrational energy to heat energy. The heat energy over time gradually dissipates from the substances and/or mechanical members of non-Newtonian characteristics SNC partially filling channel 338 into surfaces forming channel 338 and its surrounding areas.

In summary, a spray dryer absorber atomizer 34 is disclosed herein comprising a distributor housing 104 operable to distribute an absorbent liquid or slurry within a spray dryer absorber vessel 22, and an atomizer disk 146, 246 removably attached to the distributor housing 104 comprising a sealed annular channel 249, 338 at least two sealable ports 253, 356 fluidly connected to the annular channel 249, 338 and one or more substances, mechanical members, or a combination thereof of non-Newtonian characteristics partially filling the annular channel 249, 338. As such, each of the at least two ports 253, 356 are sealable by screws 253b, 370 threadedly engaged therewith or similar such plugging means. The substances of non-Newtonian characteristics SNC partially filling the annular channel 249, 338 is selected from the group consisting of natural oil, synthetic oil, high viscosity silicone, gel, wax, paraffin and combinations thereof depending on the operating conditions of the atomizer 34 within the spray dryer absorber vessel 22. The annular channel 249, 338 could as an alternative be partially filled with mechanical members of non-Newtonian characteristics SNC such as ball bearings, or with mechanical members in a substance such as ball bearings in a high viscosity silicone. The substances and/or mechanical members of non-Newtonian characteristics SNC partially filling the annular channel 249, 338 is selected for stability at a temperature of about 200° F. to about 900° F., depending on the operating conditions within the spray dryer absorber vessel 22. For example, the selected substances and/or mechanical members of non-Newtonian characteristics SNC partially filling the annular channel 249, 338 may be a high viscosity silicone stable at a temperature of about 300° F. to about 400° F. based on the operating conditions within the spray dryer absorber vessel 22. The partially filled annular channel 249 and at least two ports 253 fluidly connected thereto may be machined or formed within the atomizer disk 246. As an alternative, the partially filled annular channel 338 and at least two ports 356 fluidly connected thereto may be machined or formed within a balancer base 304 removably attached to the atomizer disk 146.

In summary, also disclosed herein is a method of fabricating a spray dryer absorber atomizer 34 with a balancer 246 that comprises providing a distributor housing 104 operable to distribute an absorbent liquid or slurry within a spray dryer absorber vessel 22, providing an atomizer disk 246 removably attached to the distributor housing 104 comprising a sealed annular channel 249 and at least two sealable ports 253 fluidly connected to the annular channel 249, partially filling via a port 253 the annular channel 249 with a substance, mechanical members, or a combination thereof of non-Newtonian characteristics, and sealing each of the at least two ports 253 after partially filling the annular channel 249. The annular channel 249 and at least two ports 253 may be machined or formed within the atomizer disk 246. As an alternative, the annular channel 338 and at least two ports 356 may be machined or formed within a balancer base 304 removably attached to the atomizer disk 146. Also, a method of using a spray dryer absorber atomizer 34 with a balancer 246, 300 is disclosed herein comprising sealing a machined or formed annular channel 249, 338 of the spray dryer absorber atomizer 34, filling partially the annular channel 249, 338 with a substance, mechanical members, or a combination thereof of non-Newtonian characteristics using at least one port 253, 356 of at least two ports 253, 356 fluidly connected to the annular channel 249, 338, and operating the spray dryer absorber atomizer 34 for rotation thereof to disperse an absorbent liquid or slurry within a spray dryer absorber vessel 22. As such, the annular channel 249 and at least two ports 253 may be machined or formed within the atomizer disk 246. As an alternative, the annular channel 338 and at least two ports 356 may be machined or formed within a balancer base 304 removably attached to the atomizer disk 146, and for example partially filled with a high viscosity silicone, or with a high viscosity silicone and ball bearings, via at least one of the at least two ports 253, 356.

The invention claimed is:

1. A spray dryer absorber atomizer with a balancer comprising:
   a distributor housing operable to distribute an absorbent liquid or slurry within a spray dryer absorber vessel; and
   an atomizer disk removably attached to the distributor housing comprising
      an annular channel;
      at least two ports fluidly connected to the annular channel; and
      a substance, member, or combination with non-Newtonian characteristics partially filling the annular channel.

2. The atomizer of claim 1, wherein each of the at least two ports are sealed by screws threadedly engaged therein.

3. The atomizer of claim 1, wherein the substance is selected from the group consisting of natural oil, synthetic oil, high viscosity silicone, gel, wax, paraffin and combinations thereof.

4. The atomizer of claim 1, wherein the member is ball bearings.

5. The atomizer of claim 1, wherein the substance, member, or combination is stable at a temperature of 200° F. to 900° F.

6. The atomizer of claim 1, wherein the substance is a high viscosity silicone stable at a temperature of 300° F. to 400° F.

7. The atomizer of claim 1, wherein the annular channel and at least two ports are machined or formed within the atomizer disk.

8. The atomizer of claim 1, wherein the annular channel and at least two ports are machined or formed within a component removably attached to the atomizer disk.

9. A method of fabricating a spray dryer absorber atomizer with a balancer comprising:
providing a distributor housing operable to distribute an absorbent liquid or slurry within a spray dryer absorber vessel;

providing an atomizer disk removably attached to the distributor housing comprising:

a sealed annular channel; and at least two ports fluidly connected to the annular channel;

partially filling via a port the annular channel with a substance, member, or combination with non-Newtonian characteristics; and sealing each of the at least two ports.

10. The method of claim 9, wherein the annular channel and at least two ports are machined or formed within the atomizer disk.

11. The method of claim 9, wherein the annular channel and at least two ports are machined or formed within a component removably attached to the atomizer disk.

12. A method of using a spray dryer absorber atomizer with a balancer comprising:

sealing a machined or formed annular channel of the spray dryer absorber atomizer;

filling partially the annular channel with a substance, mechanical members, or a combination thereof of non-Newtonian characteristics using at least one port of at least two ports fluidly connected to the annular channel; and operating the spray dryer absorber atomizer for rotation thereof to disperse an absorbent liquid or slurry within a spray dryer absorber vessel.

13. The method of claim 12, wherein the annular channel and at least two ports are machined or formed within the atomizer disk.

14. The method of claim 12, wherein the annular channel and at least two ports are machined or formed within a component removably attached to the atomizer disk.

15. The method of claim 12, wherein the annular channel is partially filled with a high viscosity silicone, or with a high viscosity silicone and ball bearings.

* * * * *